(12) United States Patent
Iwano et al.

(10) Patent No.: US 7,601,911 B2
(45) Date of Patent: Oct. 13, 2009

(54) ELECTRONIC EQUIPMENT

(75) Inventors: Kenji Iwano, Yokohama (JP); Koji Kusumoto, Yokohama (JP)

(73) Assignee: Panasonic Corporation, Osaka (JP)

( * ) Notice: Subject to any disclaimer, the term of this patent is extended or adjusted under 35 U.S.C. 154(b) by 539 days.

(21) Appl. No.: 10/560,538

(22) PCT Filed: May 26, 2004

(86) PCT No.: PCT/JP2004/007590

§ 371 (c)(1),
(2), (4) Date: Dec. 13, 2005

(87) PCT Pub. No.: WO2004/113128

PCT Pub. Date: Dec. 29, 2004

(65) Prior Publication Data

US 2006/0126274 A1    Jun. 15, 2006

(30) Foreign Application Priority Data

Jun. 19, 2003    (JP) .............................. 2003-174999

(51) Int. Cl.
*H05K 5/02* (2006.01)
*H05K 7/00* (2006.01)

(52) U.S. Cl. .................. 174/50; 174/520; 174/17 R; 220/3.2; 220/4.02; 361/600; 361/679.01

(58) Field of Classification Search .................. 174/50, 174/53, 57, 58, 17 R, 521, 535, 559, 560; 439/535, 76.1, 76.2; 361/600, 601, 679, 361/679.01, 679.02, 728, 729, 730, 735; 220/3.2–3.9, 4.02, 427; 385/134, 135

See application file for complete search history.

(56) References Cited

U.S. PATENT DOCUMENTS

| 6,002,086 | A | * | 12/1999 | Yajima | 174/51 |
| 6,157,715 | A | * | 12/2000 | Daoud | 220/4.02 |
| 6,321,925 | B1 | * | 11/2001 | Crouse et al. | 220/4.27 |
| 6,353,697 | B1 | * | 3/2002 | Daoud | 385/135 |
| 6,359,218 | B1 | * | 3/2002 | Koch et al. | 174/50 |
| 6,430,054 | B1 | * | 8/2002 | Iwata | 174/560 |

FOREIGN PATENT DOCUMENTS

| JP | 58-60977 | 4/1983 |
| JP | 11-268594 A | 10/1999 |

* cited by examiner

*Primary Examiner*—Angel R Estrada
(74) *Attorney, Agent, or Firm*—RatnerPrestia

(57) ABSTRACT

Electronic equipment according to the present invention comprises a case having an overall length substantially twice as long as a predetermined standard length in a predetermined direction shown by an arrow. The case includes a bottom cover case shorter in overall length in the predetermined direction than the standard length and available for a part of a standard length case having in the predetermined direction an overall length identical to the standard length, and an intermediate cover case longer in overall length in the predetermined direction than the standard length case and disposed on a predetermined side of the bottom cover case. The bottom cover case has an engaging portion held in engagement with the intermediate cover case, and the intermediate cover case has an engaging portion held in engagement with the engaging portion of the bottom cover case.

4 Claims, 6 Drawing Sheets

ELECTRONIC EQUIPMENT

THIS APPLICATION IS A U.S. NATIONAL PHASE APPLICATION OF PCT INTERNATIONAL APPLICATION PCT/JP2004/007590.

TECHNICAL FIELD

The present invention relates to an electronic equipment comprising a common case available for a different type of electronic equipment.

BACKGROUND ART

Conventionally, there has been known an audio equipment comprising a common case available for that of another type of audio equipment (JPN unexamined patent publication No. 10-222971 (pages 2-3, FIGS. 1-2)), which further comprises a replaceable bezel plate designed to distinguish one type of audio equipment from others.

The above-mentioned audio equipment, however, encounters such a problem that the common case is not available for an electronic equipment having a case different in size from the common case.

It is therefore an object of the present invention to provide an electronic equipment comprising a common case member available for that of a different type of electronic equipment in the case that the electronic equipment and the different type of electronic equipment are different in case size from each other.

DISCLOSURE OF INVENTION

According to a first aspect of the present invention, there is provided an electronic equipment, comprising a double length case having an overall length substantially twice as long as a predetermined standard length in a predetermined direction, in which the double length case includes a common case member shorter in overall length in the predetermined direction than the standard length and available for a part of a standard length case having in the predetermined direction an overall length identical to the standard length, and an additional case member longer in overall length in the predetermined direction than the standard length case and disposed on a predetermined side of the common case member, the common case member having a common side engaging portion held in fitting engagement with the additional case member, and the additional case member having an additional side engaging portion held in fitting engagement with the common side engaging portion of the common case member.

The common case member is available for not only a part of the double length case but also a part of the standard length case different in size from said double length case. It is therefore possible to reduce steps of designing cases and the production cost of parts of the cases and their dies in comparison with the conventional common case unavailable for a case different in size from the double length case.

According to a second aspect of the present invention, the common side engaging portion and the additional side engaging portion are held in press-fit contact with each other in a direction different from the predetermined direction.

The common case member and the additional case member are prevented from separating from each other by means of the common side engaging portion and the additional side engaging portion held in press-fit contact with each other in a direction different from the predetermined direction. This fitting engagement including press-fit contact makes it possible to reduce the number of tightening members such as screws and the steps of fixedly connecting the common case member with the additional case member by the tightening members, as compared with another engagement by which the common case member and the additional case member are not prevented from separating from each other.

According to a third aspect of the present invention, the above electronic equipment further comprises a front panel disposed on the front side of the double length case, a connecting member for fixedly connecting the common case member with the additional case member to each other, a common side tightening member operable to tighten and fixedly connect the connecting member with the common case member, and an additional side tightening member operable to tighten and fixedly connect the common case member with the additional case member. The connecting member is disposed on one or the other side in a direction in which the common case member and the front panel are arranged.

The connecting member disposed on one or the other side in a direction in which the common case member and the front panel are arranged makes it possible to increase the size of the double length case in a direction perpendicular to the direction in which the common case member and the front panel are arranged, in comparison with any one of other connecting members disposed on one or the other side in any one of directions perpendicular to the direction in which the common case member and the front panel are arranged, even in spite of the fact that there is a limit to the overall length of the double length case in the perpendicular directions.

According to a fourth aspect of the present invention, the electronic equipment further comprises a common side electronic part housed in the common case member, an additional side electronic part housed in the additional case member to be independent from the additional case member, and a harness cable having the common side electronic part and the additional side electronic part connected to each other.

The additional side electronic part housed in the additional case member and independent from the additional case member is allowed to be separated from the additional case. In addition, the additional electronic part is allowed to be connected with the harness cable. It is therefore possible to facilitate not only to design the additional electronic part but also to replace the additional electronic part with another one or an electronic part of different type.

According to a fifth aspect of the present invention, the additional case member is formed with a passage hole having the harness cable passed therethrough to connect the common side electronic part and the additional side electronic part.

The common side electronic part and the additional side electronic part are connected by the harness cable passing through the passage hole of the additional case member. The length of the harness cable between the common side electronic part and the additional side electronic part is reduced and shortened as compared with that of a harness cable for connecting the common side electronic part and the additional side electronic part without passing through the passage hole of the additional case member.

According to a sixth aspect of the present invention, the electronic equipment further comprises a common side electronic part housed in the common case member, and an additional side electronic part housed in the additional case member, while the additional case member has an electromagnetic shield part positioned between the common side electronic part and the additional side electronic part and operative to shield one of the common side electronic part and the additional side electronic part from an electromagnetic wave radiated from the other of the common side electronic part and the additional side electronic part.

In this electronic equipment, the common side electronic part is shielded from an electromagnetic wave radiated from the additional side electronic part, or/and, the additional side electronic part is shielded from an electromagnetic wave radiated from the common side electronic part. This enables to prevent each of the common side electronic part and the additional side electronic part from being adversely affected by the electromagnetic wave and falling into a malfunction.

According to a seventh aspect of the present invention, the double length case includes a cover member disposed on the opposite side of the additional case member as against the common case member. The additional case member has for covering use a cover engaging portion held in fitting engagement with the cover member, while the cover member has a cover side engaging portion held in fitting engagement with the cover engaging portion of the additional case member. The cover side engaging portion and the common side engaging portion are engageable with each other.

The cover member engageable with the common side engaging portion of the common case member is disposed on the opposite side of the additional case member as against the common case member to have the cover side engaging portion held in fitting engagement with the cover engaging portion of the additional case member. The cover member is available for the standard length case as well as the double length case. It is therefore possible for the cover member to reduce the steps of designing cases and the production cost of case parts and their dies in comparison with that of the conventional case unavailable for another cover different in case size from the double length case.

BRIEF DESCRIPTION OF THE DRAWINGS

The features and advantages of the electronic equipment according to the present invention will more clearly be understood from the following description taken in conjunction with the accompanying drawings in which.

BEST MODE FOR CARRYING OUT THE INVENTION

The electronic equipment according to the present invention will now be described in detail in accordance with a preferred embodiment shown in the accompanying drawings.

Figure 1:
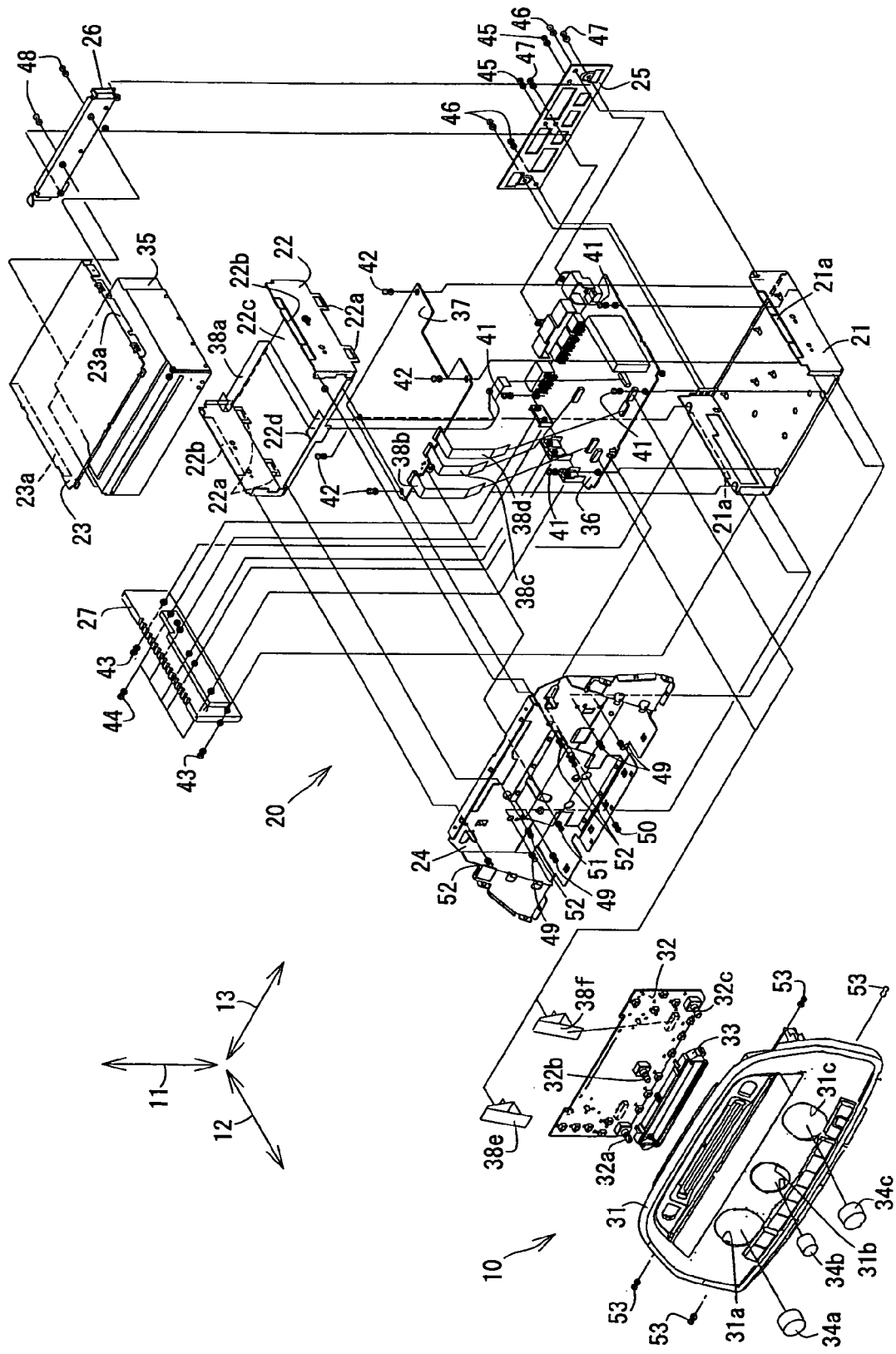
FIG. 1 is an exploded perspective view showing an embodiment of the electronic equipment according to the present invention.
Figure 2:
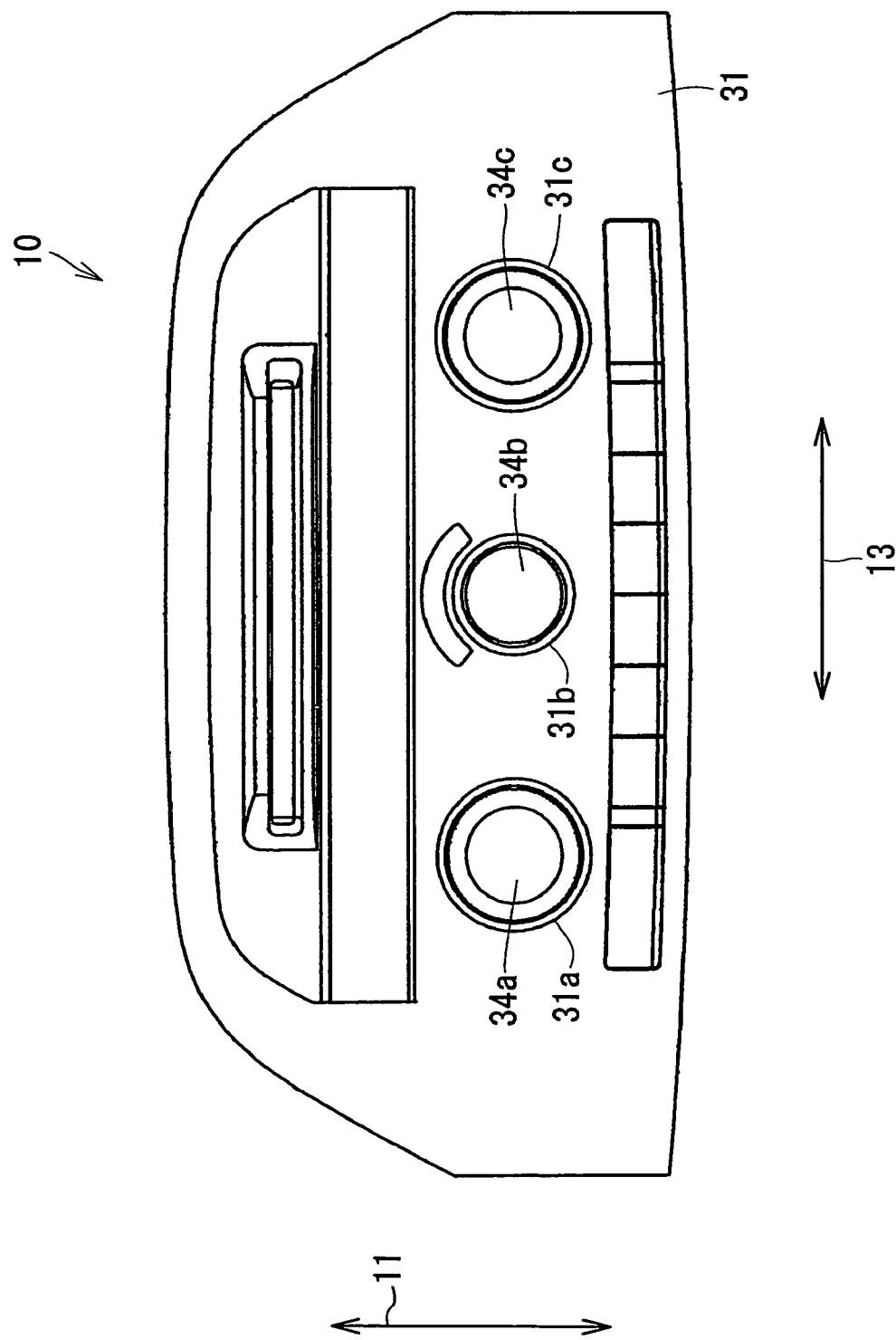
FIG. 2 is a front view of the electronic equipment shown in FIG. 1.
Figure 3:
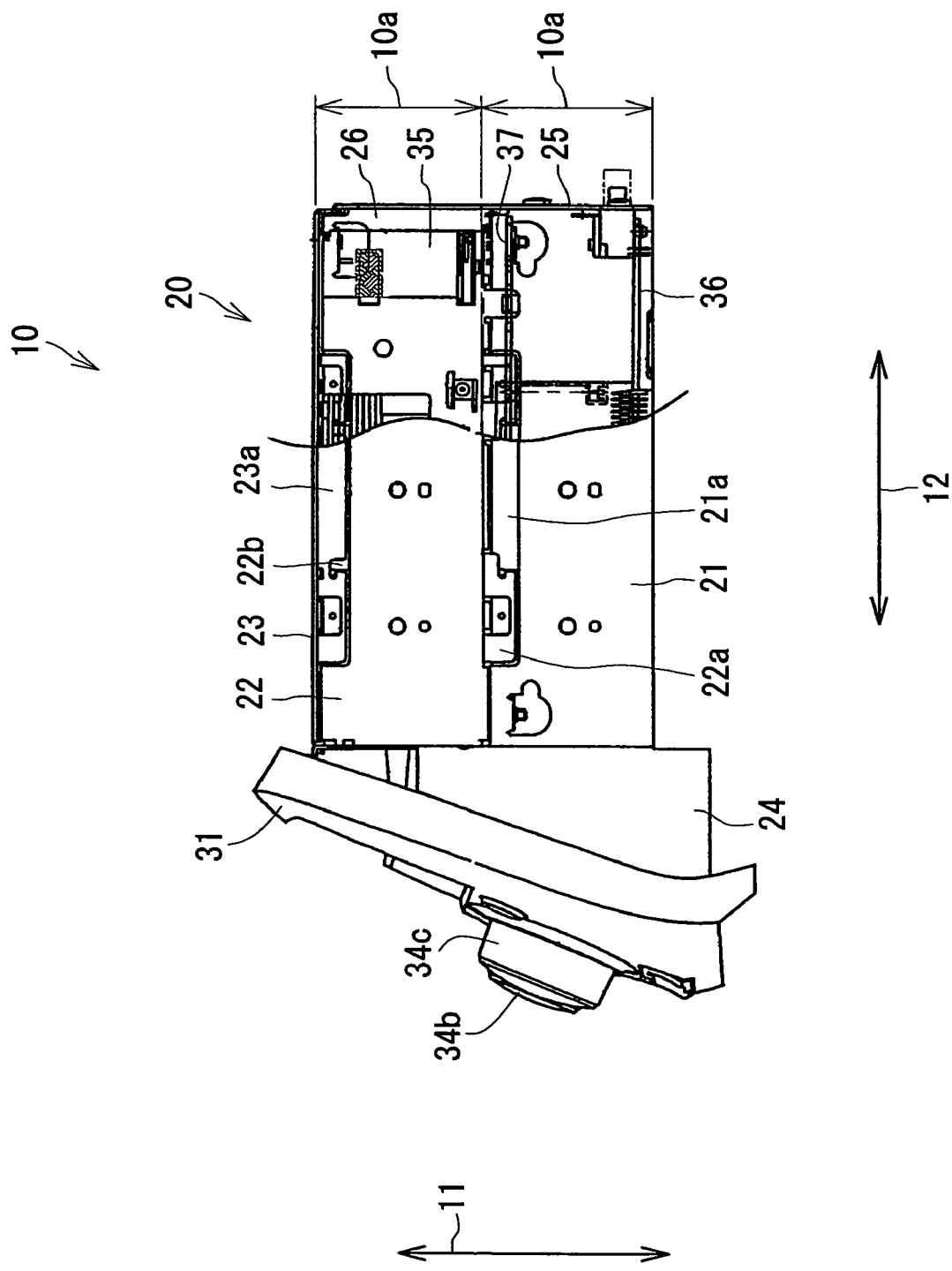
FIG. 3 is a side view of the electronic equipment shown in FIG. 1.

As shown in FIGS. 1 to 3, the present invention is exemplified in a preferred vehicle mountable electronic equipment 10, as comprising a double length case 20 having an overall length set at for example 2 DIN (Deutsche Institute Norm) size substantially twice as long as a predetermined standard length 10a (e.g., 1 DIN) in a predetermined direction shown by an arrow 11, a front panel 31 formed with a set of holes 31a, 31b and 31c and disposed on the front side of the double length case 20, a display circuit board 32 including a set of variable resistors 32a, 32b and 32c and disposed between the double length case 20 and the front panel 31, an LCD (Liquid Crystal Display) block 33 mounted on the display circuit board 32 and positioned between the front panel 31 and the display circuit board 32, a knob 34a inserted in the hole 31a of the front panel 31 and connected to the variable resistor 32a of the display circuit board 32, a knob 34b inserted in the hole 31b of the front panel 31 and connected to the variable resistor 32b of the display circuit board 32, a knob 34c inserted in the hole 31c of the front panel 31 and connected to the variable resistor 32c of the display circuit board 32, an IDC (In-Dash Changer) 35 housed in the double length case 20 for CD (Compact Disc) use, a plurality of main control boards 36, 37 each housed in the double length case 20 and operative to control other AV (Audio Visual) systems provided in the vehicle not shown in the drawings and the IDC 35, a harness cable 38a having the IDC 35 and the main board 36 connected therethrough with each other, a set of harness cables 38b, 38c and 38d having the main boards 36 and 37 connected with each other, a pair of harness cables 38e and 38f having the display circuit 32 and the main board 36 connected with each other.

The double length case 20 includes a metallic bottom cover case 21 accommodating the main control boards 36 and 37, a metallic intermediate cover case 22 accommodating the IDC 35, a metallic top cover case 23 disposed on the opposite side of the intermediate cover case 22 as against the bottom cover case 21, a metallic front plate 24 disposed to be positioned between the bottom cover case 21 and the display circuit board 32 on one side of the bottom cover case 21 in a direction in which the bottom cover case 21 and the front panel 31 are arranged, a metallic rear plate 25 disposed on the other side of the bottom cover case 21 in the direction in which the bottom cover case 21 and the front panel 31 are arranged, a metallic mounting member 26 for mounting the IDC 35 on the rear plate 25, and a metallic heat sink 27 adapted to radiate therethrough heat from the main control boards 36 and 37.

The electronic equipment 10 further comprises a plurality of male screws 41 each screwed in the bottom cover case 21 and tightened to fixedly connect the bottom cover case 21 with the main control board 36, a plurality of male screws 42 each screwed in the bottom cover case 21 and tightened to fixedly connect the bottom cover case 21 with the main control board 37, a plurality of male screws 43 each screwed in the bottom cover case 21 and tightened to fixedly connect the bottom cover case 21 with the heat sink 27, a plurality of male screws 44 each screwed in a part of the main control board 36 and tightened to fixedly connect the main control board 36 with the heat sink 27, a plurality of male screws 45 each screwed in the mounting member 26 and tightened to fixedly connect the rear plate 25 with the mounting member 26, a plurality of male screws 46 each screwed in the bottom cover case 21 and tightened to fixedly connect the bottom cover case 21 with the rear plate 25, a plurality of male screws 47 each screwed in a part of the main control board 36 with tightened to fixedly connect the main control board 36 and the rear plate 25, a plurality of male screws 48 each screwed in a part of the IDC 35 and tightened to fixedly connect the mounting member 26 with the IDC 35, a plurality of male screws 49 each screwed in the bottom cover case 21 and tightened to fixedly connect the bottom cover case 21 with the front plate 24, a plurality of male screws 50 each screwed in a part of the main control board 36 and tightened to fixedly connect the front plate 24 with the main control board 36, a plurality of male screws 51 each screwed in a part of the main control board 37 and tightened to fixedly connect the front plate 24 with the main control board 37, a plurality of male screws 52 each screwed in the intermediate cover case 22 and tightened to fixedly connect the intermediate cover case 22 with the front plate 24, and a plurality of male screws 53 each screwed in the front plate 24 and tightened to fixedly connect the front plate 24 with the front panel 31.

The bottom cover case 21 is available for a part of a case 70 (See FIG. 4) of 1 DIN size that is a standard length case having in the predetermined direction shown by the arrow 11 an overall length 10*a*. This bottom cover case 21 constitutes a common case member shorter in overall length in the predetermined direction than the standard length and available for a part of the standard length case. The bottom cover case 21 also has left and right engaging portions 21*a*, i.e., a pair of common side engaging portions each held in fitting engagement with the intermediate cover case 22. Each of the main control boards 36, 37 constitutes a common side electronic part housed in the bottom cover case 21.

The intermediate cover case 22 constitutes an additional case member longer in overall length in the predetermined direction shown by the arrow 11 than the length 10*a* and disposed on a predetermined side of the bottom cover case 21 in the predetermined direction shown by the arrow 11. The intermediate cover case 22 also has left and right engaging portions 22*a*, i.e., a pair of additional side engaging portions each held in fitting engagement with the common side engaging portions 21*a* of the bottom cover case 21, left and right engaging portions 22*b*, i.e., a pair of cover engaging portions each held in fitting engagement with the top cover case 23, and an electromagnetic shield part 22*c* positioned between the IDC 35 and the main control boards 36, 37 and operative to shield an electromagnetic wave. The above common side engaging portions 21*a* of the bottom cover case 21 and the additional side engaging portions 22*a* of the intermediate cover case 22 are held in press-fit contact with each other in the direction shown by the arrow 13 different from both of the predetermined direction shown by the arrow 11 and a direction shown by an arrow 12. Further, the electromagnetic shield part 22*c* of the intermediate cover case 22 is formed with a passage hole 22*d* having the harness cable 38*a* passed therethrough. The IDC 35 constitutes an additional side electronic part independent and separated from the intermediate cover case 22 and housed in the intermediate cover case 22. This IDC 35 is securely mounted on the intermediate cover case 22 by screws not shown in the drawings.

The top cover case 23 of the double length case 20 has left and right engaging portions 23*a* each of which is a cover side engaging portion held in fitting engagement with any one of the cover engaging portions 22*b* of the intermediate cover case 22. The cover side engaging portions 23*a* of the top cover case 23 and the common side engaging portions 21*a* of the bottom cover case 21 are formed to be engageable with each other.

The front plate 24 of the double length case 20 constitutes a connecting member for fixedly connecting the bottom case member 21 and the intermediate case member 22 to each other. Each of the male screws 49 constitutes a common side tightening member tightened to fixedly connect the front plate 24 with the bottom cover case 21, while each of the male screws 52 constitutes an additional side tightening member tightened to fixedly connect the intermediate cover case 22 with the front plate 24.

The rear plate 25 of the double length case 20 also constitutes another connecting member for fixedly connecting the bottom case member 21 and the intermediate case member 22 to each other. Each of the male screws 46 constitutes a common side tightening member tightened to fixedly connect the bottom cover case 21 with the rear plate 25, while each of the male screws 45 constitutes an additional side tightening member tightened to fixedly connect the intermediate cover case 22 with the rear plate 25.

As aforementioned, the bottom cover case 21 of the double length case 20 is available for a part of the case 70 having the overall length 10*a* in the direction shown by the arrow 11.

Figure 4:
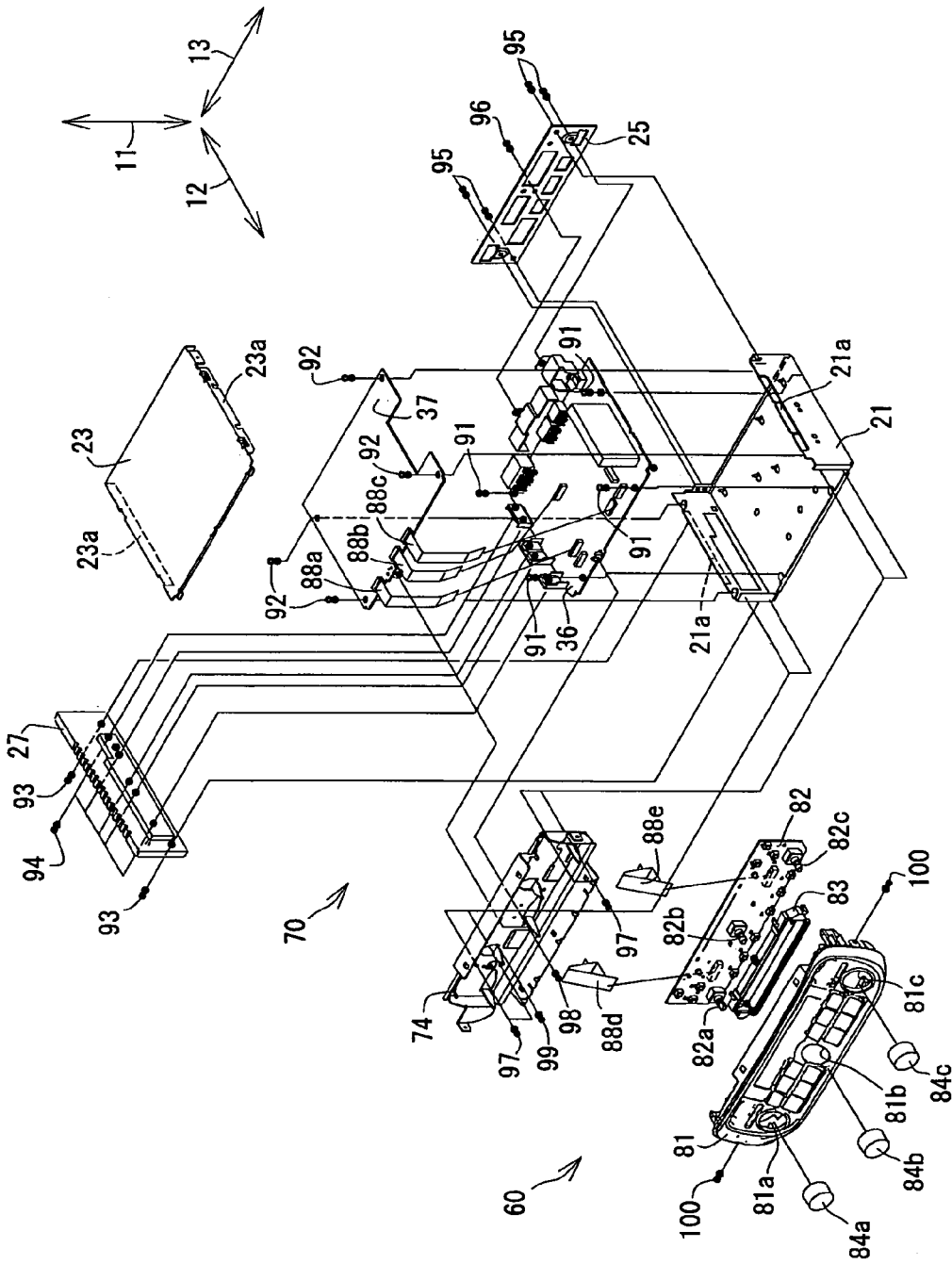
FIG. 4 is an exploded perspective view showing another embodiment of the electronic equipment according to the present invention.

FIG. 4 shows a dash mount electronic equipment 60 and the case 70.

Figure 5:
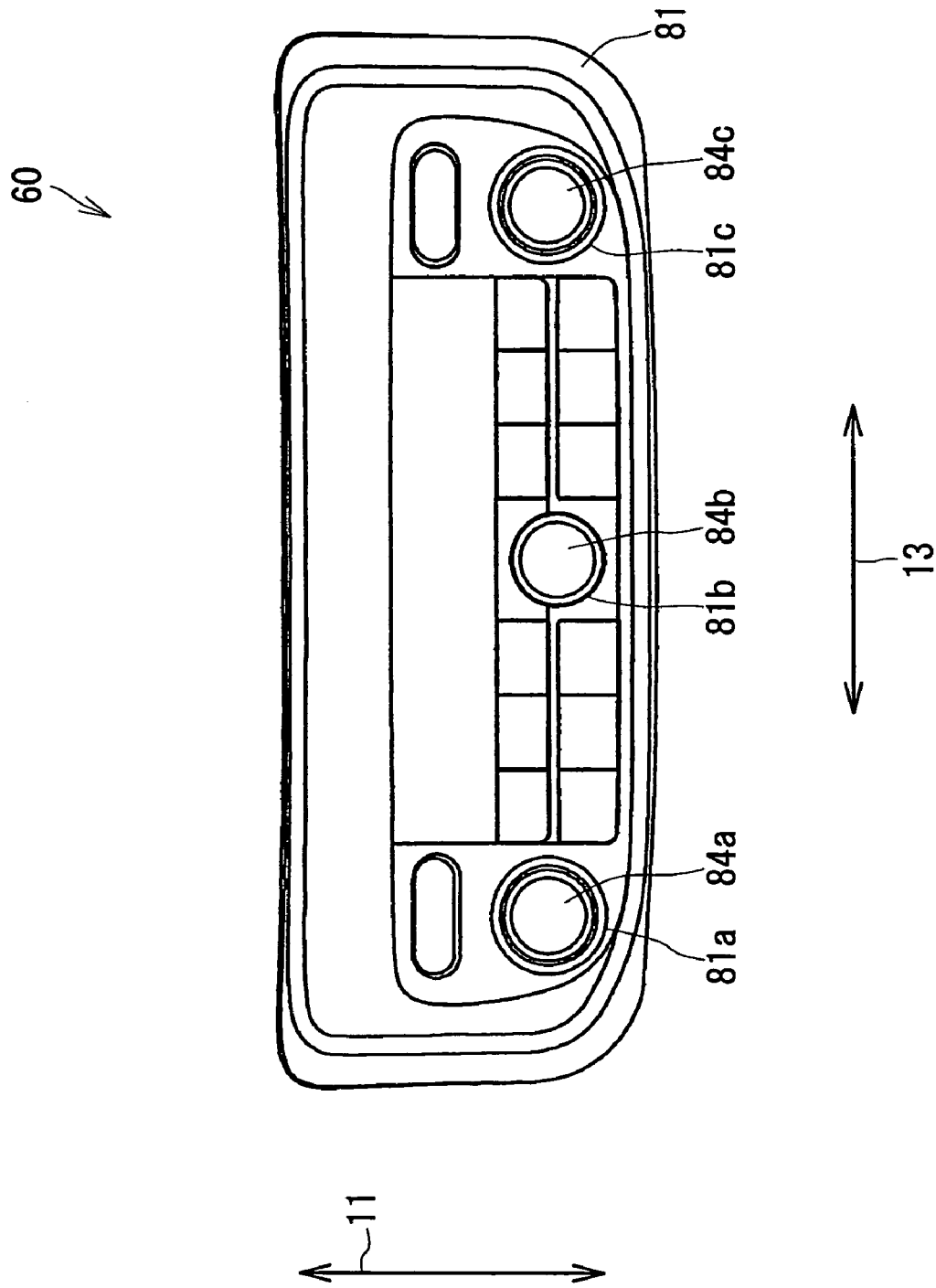
FIG. 5 is a front view of the electronic equipment shown in FIG. 4.
Figure 6:
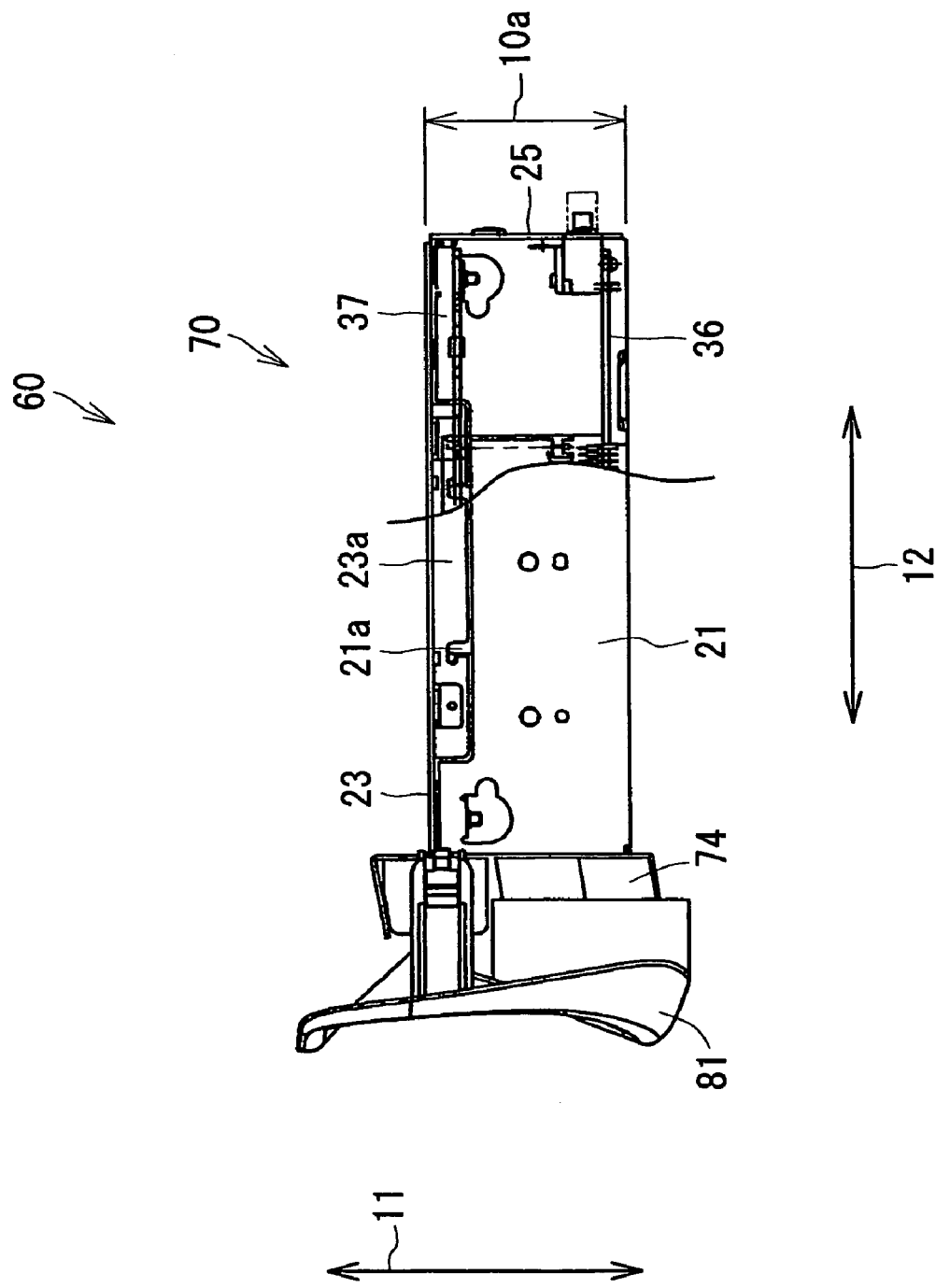
FIG. 6 is a side view of the electronic equipment shown in FIG. 4.

As shown in FIGS. 4-6, the electronic equipment 60 comprises the above case 70 of 1 DIN size having an overall length 10*a* in the direction shown in the arrow 11, a front panel 81 formed with a set of holes 81*a*, 81*b* and 81*c* and disposed on the front side of the case 70, a display circuit board 82 including a set of variable resistors 82*a*, 82*b* and 82*c*, disposed between the case 70 and the front panel 81 and mounted on the front panel 81, an LCD block 83 mounted on the display circuit board 82 and positioned between the front panel 81 and the display circuit board 82, a knob 84*a* inserted in the hole 81*a* of the front panel 81 and connected to the variable resistor 82*a* of the display circuit board 82, a knob 84*b* inserted in the hole 81*b* of the front panel 81 and connected to the variable resistor 82*b* of the display circuit board 82, a knob 84*c* inserted in the hole 81*c* of the front panel 81 and connected to the variable resistor 82*c* of the display circuit board 82, a plurality of main control boards 36, 37 each housed in the case 70 and operative to control other AV (Audio Visual) systems provided in the vehicle not shown in the drawings, a set of harness cables 88*a*, 88*b* and 88*c* having the main boards 36 and 37 connected with each other, and a pair of harness cables 88*d* and 88*e* having the display circuit 82 and the main control board 36 connected with each other.

The case 70 includes the above metallic bottom cover case 21 having the main control boards 36 and 37 accommodated therein, the metallic top cover case 23, a metallic front plate 74 disposed to be positioned between the bottom cover case 21 and the display circuit board 82 on one side of the case 70 in the direction shown by the arrow 12 in which the bottom cover case 21 and the front panel 81 are arranged, a metallic rear plate 25 disposed on the other side of the case 70, i.e., the opposite side of the case 70 as against the front plate 74 in the direction shown by the arrow 12, and a metallic heat sink 27 adapted to radiate therethrough heat from the main control boards 36 and 37. Here, the common side engaging portions 21*a* of the bottom cover case 21 and the cover side engaging portions 23*a* of the top cover case 23 are held in press-fit contact with each other in the direction shown by the arrow 13 perpendicular to the predetermined direction shown by the arrow 11 and the direction shown by an arrow 12.

The electronic equipment 60 further comprises a plurality of male screws 91 each screwed in the bottom cover case 21 and tightened to fixedly connect the bottom cover case 21 with the main control board 36, a plurality of male screws 92 each screwed in the bottom cover case 21 and tightened to fixedly connect the bottom cover case 21 with the main control board 37, a plurality of male screws 93 each screwed in the bottom cover case 21 and tightened to fixedly connect the bottom cover case 21 with the heat sink 27, a plurality of male screws 94 each screwed in a part of the main control board 36 and tightened to fixedly connect the main control board 36 with the heat sink 27, a plurality of male screws 95 each screwed in the bottom cover case 21 and tightened to fixedly connect the bottom cover case 21 with the rear plate 25, a plurality of male screws 96 each screwed in a part of the main control board 36 and tightened to fixedly connect the rear plate 25 and the main control board 36, a plurality of male screws 97 each screwed in the bottom cover case 21 and tightened to fixedly connect the bottom cover case 21 with the front plate 74, a plurality of male screws 98 each screwed in a part of the main control board 36 and tightened to fixedly connect the front plate 74 with the main control board 36, a plurality of male screws 99 each screwed in a part of the main control board 37 and tightened to fixedly connect the front plate 74 with the main control board 37, and a plurality of male screws 100 each screwed in the front plate 74 and tightened to fixedly connect the front plate 74 with the front panel 81.

Hereinafter, the process of assembling the above electronic equipment 10 shown in FIG. 1 is described.

Firstly, the main control board 36 is securely mounted on the bottom cover case 21 by the male screws 41 while the main control board 37 is securely mounted on the bottom cover case 21 by the male screws 42. The harness cables 38a, 38b, 38c, 38d, 38e and 38f are also connected to the main control board 36 and 37 mounted on the bottom cover case 21.

Then, the heat sink 27 is fixedly connected by the plurality of male screws 43 and 44 to the bottom cover case 21 and the main control board 36 securely mounted on the bottom cover case 21. The harness cable 38a is then led through the passage hole 22d of the intermediate cover case 22, while the engaging portions 22a of the intermediate cover case 22 are brought into fitting engagement with the engaging portions 21a of the bottom cover case 21 to securely mount the intermediate cover case 22 on the bottom cover case 21.

The harness cable 38a led through the passage hole 22d of the intermediate cover case 22 is then connected to the IDC 35, while the IDC 35 is securely mounted on the intermediate cover case 22 by male screws not shown in the drawings.

The engaging portions 23a of the top cover case 23 are then brought into fitting engagement with the engaging portions 22b of the intermediate cover case 22 to securely mount the top cover case 23 on the intermediate cover case 22. The rear plate 25 and the mounting member 26, preliminarily fixedly connected to each other by the male screws 45, are then fixedly connected to the bottom cover case 21, the main control board 36 and the IDC 35 by the male screws 46, 47 and 48, respectively, while the front plate 24 is fixedly connected to the bottom cover case 21, the main control board 36, the main control board 37 and the intermediate cover case 22 by the male screws 49, 50 and 51 and 52.

Then, the display circuit board 32, the LCD block 33 and the knob 34a, 34b and 34c are respectively attached to the front panel 31, while the harness cables 38e and 38f are connected to the display circuit board 32 attached to the front panel 31. Finally, the front panel 31 is securely mounted on the front plate 24 by the male screws 53. The electronic equipment 10 is thus assembled.

Next, the process of assembling the electronic equipment 60 shown in FIG. 4 is described.

Firstly, the main control board 36 is securely mounted on the bottom cover case 21 by the male screws 91 while the main control board 37 is securely mounted on the bottom cover case 21 by the male screws 92. The harness cables 88a, 88b, 88c, 88d and 88e are also connected to the main control board 36 and 37 mounted on the bottom cover case 21.

Then, the heat sink 27 is fixedly connected to each of the bottom cover case 21 and the main control board 36 securely mounted on the bottom cover case 21. The engaging portions 23a of the top cover case 23 are then brought into fitting engagement with the engaging portions 21a of the bottom cover case 21 to securely mount the top cover case 23 on the bottom cover case 21.

The rear plate 25 is then fixedly connected to the bottom cover case 21 and the main control board 36 respectively by the male screws 95 and 96, while the front plate 74 is fixedly connected to the bottom cover case 21, the main control board 36 and the main control board 37 by the male screws 97, 98 and 99.

Then, the display circuit board 82, the LCD block 83 and the knob 84a, 84b and 84c are respectively attached to the front panel 81, while the harness cables 88d and 88e are connected to the display circuit board 82 attached to the front panel 81. Finally, the front panel 81 is securely mounted on the front plate 74 by the male screws 100. The electronic equipment 60 is thus assembled.

According to the electronic equipment 10 shown in FIG. 3, the double length case 20 of 2 DIN size is mainly constituted by the bottom cover case 21, the top cover case 23, the rear plate 25 and the heat sink 27 which are also available for the corresponding parts of the case 70 of 1 DIN size shown in FIG. 6. It is therefore possible to reduce the steps of designing cases and the production cost of parts of the cases and their dies in comparison with a case constituted by exclusive parts similar to the bottom cover case 21, the top cover case 23, the rear plate 25 and the heat sink 27 and unavailable for any one of the cases different in size from the double length case 20.

The above electronic equipment 10, however, may be modified by changing one of the top cover case 23, the rear plate 25 and the heat sink 27 not to be used for the case 70 of 1 DIN size but to be exclusively used for the double length case 20 of 2 DIN size.

The main control boards 36 and 37 are available for the parts of the electronic equipment 10 as well as those of the electronic equipment 60, thereby making it possible to reduce the steps of designing control boards and the production cost of the control boards in comparison with exclusive control boards similar to the main control boards 36 and 37. However, one of the main control boards 36 and 37 of the electronic equipment 10 may be replaced an exclusive main control board unavailable for the electronic equipment 60.

According to the present embodiment, the bottom cover case 21 and the intermediate cover case 22 are prevented from separating from each other by means of the engaging portions 21a and 22a held in press-fit contact with each other in the direction shown by the arrow 13. This fitting engagement including the press-fit contact of the bottom cover case 21 and the intermediate cover case 22 makes it possible to reduce connecting steps of the bottom cover case 21 and the intermediate cover case 22 and the number of screws and other tightening parts of the case 20 as compared with engagement by which the bottom cover case 21 and the intermediate cover case 22 are not prevented from separating from each other. In the electronic equipment 10, the engaging portions 21a and 22a may be held out of press-fit contact with each other in one direction different form the predetermined direction shown by the arrow 11.

Further, according to the present electronic equipment 10, the front plate 24 and the rear plate 25 are respectively disposed on one side and the other side of the bottom cover case 21 in the direction shown by the arrow 12. These plates 24, 25 make it possible to increase the size of the double length case 20 in a direction perpendicular to the direction shown by the arrow 12, even in the case that there is a limit to the overall length of the double length case 20 in the direction shown by the arrow 13, in comparison with other connecting members disposed on one and/or the other side in the direction shown by the arrow 13. The electronic equipment according to the present invention, however, may comprise a connecting member on one or/and the other side in the direction shown by the arrow 13.

In the present electronic equipment 10, the IDC 35, i.e., the additional side electronic part housed in and independent from the intermediate cover case 22 is allowed to be separated from the intermediate cover case 22. In the case that the IDC 35 has a certain connecting portion facing to the intermediate cover case 22, the connecting portion can be connected with the harness cable 38a. It is therefore possible to facilitate to design the IDC 35 in comparison with an additional side electronic part inseparably or partly integrally mounted on the intermediate cover plate 22, i.e., the additional case member. The electronic equipment according to the present invention, however, may comprise an additional side electronic part inseparably housed in the additional case member, such as for example an additional side electronic part having a casing member forming part of the additional case member.

Furthermore, the electromagnetic shield part 22c of the intermediate cover case 22 formed with the passage hole 22d allows the harness cable 38a to pass therethrough to connect the main control board 36, i.e., the common side electronic part and the IDC 35. The intermediate cover case 22 therefore makes it possible to reduce and shorten the length of the harness cable 38a between the main control board 36 and the IDC 35 as compared with a common side case member having no passing hole allowing the harness cable 38a to pass therethrough to connect the main control board 36 and the IDC 35.

In this electronic equipment 10, the main control boards 36 and 37 are shielded from an electromagnetic wave radiated from the IDC 35, or/and, the IDC 35 is shielded from an electromagnetic wave radiated from either the main control board 36 or the main control board 37. This enables to prevent each of the main control boards 36 and 37 from being adversely affected by the electromagnetic wave and falling into a malfunction. However, the electronic equipment 10 may comprise an additional case member having no electromagnetic shield portion between the main control boards 36, 37 and the IDC 35.

The electronic equipment 10 is assembled in a similar manner to the electronic equipment 60 by an assembling system. The assembling system can therefore be used for common use and shared by the electronic equipment 10 and the electronic equipment 60. It is therefore possible for the assembling system to produce each of the electronic equipments 10 and 60 less costly in comparison with an inclusive assembling system which cannot be used arbitrarily to assemble each of the electronic equipment 10 and the electronic equipment 60.

The above electronic equipment 10 may be modified by replacing the IDC 35 by another electronic part different in type from the IDC 35, although the electronic equipment 10 comprises the IDC 35 as an additional side electronic part. The additional side electronic part of the electronic equipment 10 may be constituted by a deck such as for example a cassette tape deck, MD (Mini Disc) deck or the like, or an electronic circuit board. Similarly, the above electronic equipment 10 may be modified by replacing the main control board 36 or 37, i.e., the common side electronic part by another electronic part different in type from the main control board 36 or 37.

Although the above electronic equipment 10 is constituted by the bottom cover case 21, the top cover case 23 and the intermediate cover case 22 disposed on the side of the bottom cover case 21 to be positioned between the bottom cover case 21 and the top cover case 23, the electronic equipment 10 may be modified by changing the disposition of the additional side case member such as the intermediate cover case 22 to be on the opposite of the bottom cover case 21 as against the top cover case 23.

INDUSTRIAL APPLICABILITY

As will be seen from the foregoing description, the electronic equipment according to the present invention comprises a common case member available for each of the cases different in size from one another. The present invention is therefore useful to various types of electronic equipments each comprising a case.

The invention claimed is:

1. An electronic equipment, comprising:
a double length case having an overall length substantially twice as long as a predetermined length in a predetermined direction, in which said double length case includes a common case member, the greatest length of the common case member being shorter in length in said predetermined direction than said predetermined length and available for a part of a predetermined length case, the predetermined length case having in said predetermined direction a length identical to said predetermined length, and an additional case member, the greatest length of the additional case member being longer in length in said predetermined direction than said predetermined length case and disposed on a predetermined side of said common case member, said common case member having a common side engaging portion held in fitting engagement with said additional case member, and said additional case member having an additional side engaging portion held in fitting engagement with said common side engaging portion of said common case member;
a front panel disposed on the front side of said double length case;
a connecting member for fixedly connecting said common case member and said additional case member to each other;
a common side tightening member operable to tighten and fixedly connect said connecting member with said common case member; and
an additional side tightening member operable to tighten and fixedly connect said connecting member with said additional case member,
said connecting member being disposed on one or the other side in a direction in which said common case member and said front panel are arranged.

2. An electronic equipment, comprising:
a double length case having an overall length substantially twice as long as a predetermined length in a predetermined direction, in which said double length case includes a common case member, the greatest length of the common case member being shorter in length in said predetermined direction than said predetermined length and available for a part of a predetermined length case, the predetermined length case having in said predetermined direction a length identical to said predetermined length, and an additional case member, the greatest length of the additional case member being longer in length in said predetermined direction than said predetermined length case and disposed on a predetermined side of said common case member, said common case member having a common side engaging portion held in fitting engagement with said additional case member, and said additional case member having an additional side engaging portion held in fitting engagement with said common side engaging portion of said common case member;

a common side electronic part housed in said common case member;

an additional side electronic part housed in said additional case member to be independent from said additional case member; and a harness cable having said common side electronic part and said additional side electronic part connected to each other.

3. An electronic equipment as set forth in claim 2, in which said additional case member is formed with a passage hole having said harness cable passed therethrough to connect said common side electronic part and said additional side electronic part.

4. An electronic equipment as set forth in claim 2, in which said double length case includes a cover member disposed on the opposite side of said additional case member as against said common case member, said additional case member having for covering use a cover engaging portion held in fitting engagement with said cover member, and said cover member having a cover side engaging portion held in fitting engagement with said engaging portion of said additional case member, said cover side engaging portion and said common side engaging portion being engageable with each other.

* * * * *